United States Patent
Altonji

(10) Patent No.: US 6,991,211 B2
(45) Date of Patent: Jan. 31, 2006

(54) PNEUMATICALLY ACTUATED VALVE

(76) Inventor: Robert Altonji, 2330 Hillcrest Rd., Quakertown, PA (US) 18951

( * ) Notice: Subject to any disclaimer, the term of this patent is extended or adjusted under 35 U.S.C. 154(b) by 56 days.

(21) Appl. No.: 10/747,563

(22) Filed: Dec. 29, 2003

(65) Prior Publication Data

US 2005/0139796 A1   Jun. 30, 2005

(51) Int. Cl.
*F16K 31/00* (2006.01)

(52) U.S. Cl. .......... 251/63; 251/29; 251/63.5; 251/30.02; 251/30.03; 251/129.03; 251/291

(58) Field of Classification Search ........ 251/28, 251/29, 30.01–30.03, 62–63.6, 129.03, 291
See application file for complete search history.

(56) References Cited

U.S. PATENT DOCUMENTS

| | | |
|---|---|---|
| 3,379,214 A | 4/1968 | Weinberg |
| 3,517,699 A | 6/1970 | Marcum |
| 4,630,645 A | 12/1986 | Spa |
| 4,942,852 A | 7/1990 | Richeson et al. |
| 4,964,424 A | 10/1990 | Helbig et al. |
| 2001/0050705 A1 | 12/2001 | Hoen et al. |

FOREIGN PATENT DOCUMENTS

EP   0 715 109 A1   6/1996

*Primary Examiner*—J. Casimer Jacyna
(74) *Attorney, Agent, or Firm*—Caesar, Rivise, Bernstein, Cohen & Pokotilow, Ltd.

(57) ABSTRACT

A pneumatically actuated fluid control valve includes a piston and a piston actuator including a permanent magnet. First and second piston actuator positions for magnetically disposing the piston in valve open and valve closed positions are provided. A pneumatic actuator driving circuit pneumatically moves the piston actuator from one to the other of first and second piston actuator positions to dispose the piston in the open and closed positions. The valve includes an annular valve assembly. One valve assembly position is a normally closed position and a positive air flow control signal moves the piston to open the valve. Another valve assembly position is a normally open position and a positive air flow control signal moves the piston to close the valve.

24 Claims, 4 Drawing Sheets

PNEUMATICALLY ACTUATED VALVE

BACKGROUND OF THE INVENTION

1. Field of Invention

This invention relates to valves and, in particular, the field of pneumatic valves.

2. Description of Related Art

It is well known in the field of valves to provide valve control signals for remotely causing valves to open and close, in order to permit fluid flow therethrough. A common method for performing this was to provide a solenoid capable of moving a piston between valve open and valve closed positions. In solenoid controlled valves of this type, a control current was applied to the coil of the solenoid to energize the solenoid and produce electromagnetic flux capable of moving the piston. Many examples of such solenoid actuated valves are known.

One example of a solenoid actuated valve is taught in U.S. Pat. No. 3,379,214, entitled "Permanent Magnet Valve Assembly," issued to Weinberg on Apr. 23, 1965. Weinberg teaches a permanent magnetic valve assembly, having an electromagnetically actuated valve member, wherein a coil was energized to provide electromagnetic flux. A permanent magnet was also provided to provide permanent magnetic flux. When the flux of the coil that was energized opposed and exceeded the flux of the permanent magnet, a plunger was shifted. A flux in the opposite direction by an opposing current could move the piston in the opposite direction.

U.S. Patent Application Publication No. 2001/0050705, entitled "Magnetically-Actuated Fluid Control Valve", published on Dec. 13, 2001 and based upon U.S. patent application Ser. No. 09/930,098, also included a magnetic actuator containing both a permanent magnet and an electromagnet. An armature, configured as a see-saw and coupled to the magnetic actuator, caused the valve to open by displacing selected regions of a diaphragm and forcing the diaphragm into contact with a valve seat.

However, solenoid actuated valves can be dangerous in explosive surroundings. For example, they can be dangerous on oil drilling platforms or in use with chemicals in a chemical plant. The danger caused by solenoid valves arises from the fact that the electric current applied to the solenoid coils, for energizing the coils to provide electromagnetic flux to move the pistons under fault conditions can ignite flammable or explosive materials in the vicinity of the valves.

One solution to the problem was to limit the magnitude of the solenoid-actuating current to a level below the level which could possibly ignite a fire or cause an explosion, in a worst case scenario, within the particular hazardous environment where the valve was used. However, limitations on the amount of current that can be used to energize a solenoid places limitations on the size of the piston that can be moved as well as the speed and acceleration of the piston movement. Therefore, it was very difficult and expensive to obtain adequate solenoid activated valves suitable for many applications within hazardous areas.

Another solution was to provide valves that were actuated using permanent magnets rather than solenoids. For example, U.S. Pat. No. 4,942,852, entitled "Electro-Pneumatic Actuator," issued to Richeson on Jul. 24, 1990, teaches a valve suitable for internal combustion engines. The actuator taught by Richenson was a pneumatically powered transducer for use as a valve mechanism actuator. The transducer had a piston which was powered by a pneumatic source and held in each of its extreme positions. Air control valves were held in their closed positions by pressured air and/or permanent magnet latching arrangements and the control valves are released to supply air to the piston. When the piston was thus released it was driven to the opposing extreme position by the permanent magnetic field. However, even though the Richeson valve used permanent magnet actuation, it was not completely free of electrical circuits.

U.S. Pat. No. 3,517,699, entitled "Magnetic-Pneumatic Proximity Switch," issued to Marcum on Oct. 20, 1967, teaches a magnetic-pneumatic proximity switch. In the Marcum system, air flow was controlled by a valve without electrical circuit. Instead, a magnetic proximity switch was provided. The magnetic proximity valve taught by Marcum operated as a restriction device in a pneumatic circuit that opened and closed, thereby controlling a spool valve. The spool valve in turn controlled the flow of an operating fluid to or from a working piston and cylinder device.

U.S. Pat. No. 4,630,645, entitled "Pneumatic Switching Device, E.G., For Safeguarding Against Overpressure," issued to Spa on Dec. 23, 1986, also taught a valve that could be actuated without any electrical current. In the Spa device, a piston was received in a bore of a housing. The piston had a narrowed portion between two end surfaces. Two seals were provided in the narrowed portion that acted cooperatively with seats projecting from the wall of the housing bore towards the piston axis. A compression spring acted on one end face of the piston. The other piston end face delimited a pressure chamber with the housing wherein the air valve was in communication with the pressure chamber. A pilot air aperture had a restriction opening into the chamber and an out flow aperture opened between both housing seats. A signal pressure aperture opened into the bore beyond each seat. The pivotal lever engaged an actuation pin of the air valve.

U.S. Pat. No. 4,964,424, entitled "Pneumatic Valve Assembly For Controlling A Stream of Compressed Air," issued to Helbig on Oct. 23, 1990. The valve assembly taught by Helbig was adapted for controlling compressed air stream in response to a non-contacting actuation. It included a pivoted one-arm or double-arm lever, a permanent magnet on one side or on each of both sides of its pivotal axis and via a ferromagnetic or magnetic actuating member. The actuating member was moved into proximity of the permanent magnet or magnets by means of a plunger, causing a pilot orifice to be opened or closed. A pilot air stream flowed through the orifice for actuating a pilot piston to move a valve piston to positions in which the valve was opened or closed. Permanent magnets were provided on the lever on both sides of its pivotal axis. The permanent magnets were interconnected by a magnetic yoke. The magnetic yoke was oppositely poled so that a magnet which was moveable into the proximity of both permanent magnets outside the valve body constituted an actuating member that attracted one permanent magnet on the double-armed lever and repelled the other of the permanent magnets. European Publication EP0715109A1 also teaches a valve having a permanent magnet actuation mechanism.

All references cited herein are incorporated herein by reference in their entireties.

BRIEF SUMMARY OF THE INVENTION

A pneumatically actuated fluid control valve for permitting flow of a fluid from a valve inlet to a valve outlet includes a piston having a valve open piston position and a valve closed piston position for controlling the fluid flow and a piston actuator including a permanent magnet having magnetic flux for applying the magnetic flux to the piston.

At least first and second piston actuator positions are provided for magnetically disposing the piston in a selected one of the valve open and valve closed positions. The pneumatically actuated fluid control valve is provided with a pneumatic actuator driving circuit for pneumatically disposing the piston actuator in the first and second piston actuator positions thereby pneumatically moving the piston from one to the other of the valve open and valve closed piston positions. The pneumatically actuated fluid control valve includes an annular valve assembly and the piston is disposed in the center of the annular valve assembly. A first valve assembly position is a normally closed valve assembly position and a positive air flow control signal into the magnet driving assembly adjusts the chamber volume to apply increasing magnet flux to the piston and to move the piston from the valve closed position to the valve open position. A second valve assembly position is a normally open valve assembly position and a positive air flow control signal into the magnet driving chamber adjusts the chamber volume to apply decreasing magnetic flux to the piston and to move the piston from the valve open position to the valve closed position. A further magnet driving chamber and a further air flow control signal can be provided for applying opposing pressures to the piston in accordance with two separate air flow control signals to apply a differential pressure to the piston actuator to control the actuator according to the difference in pressures.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
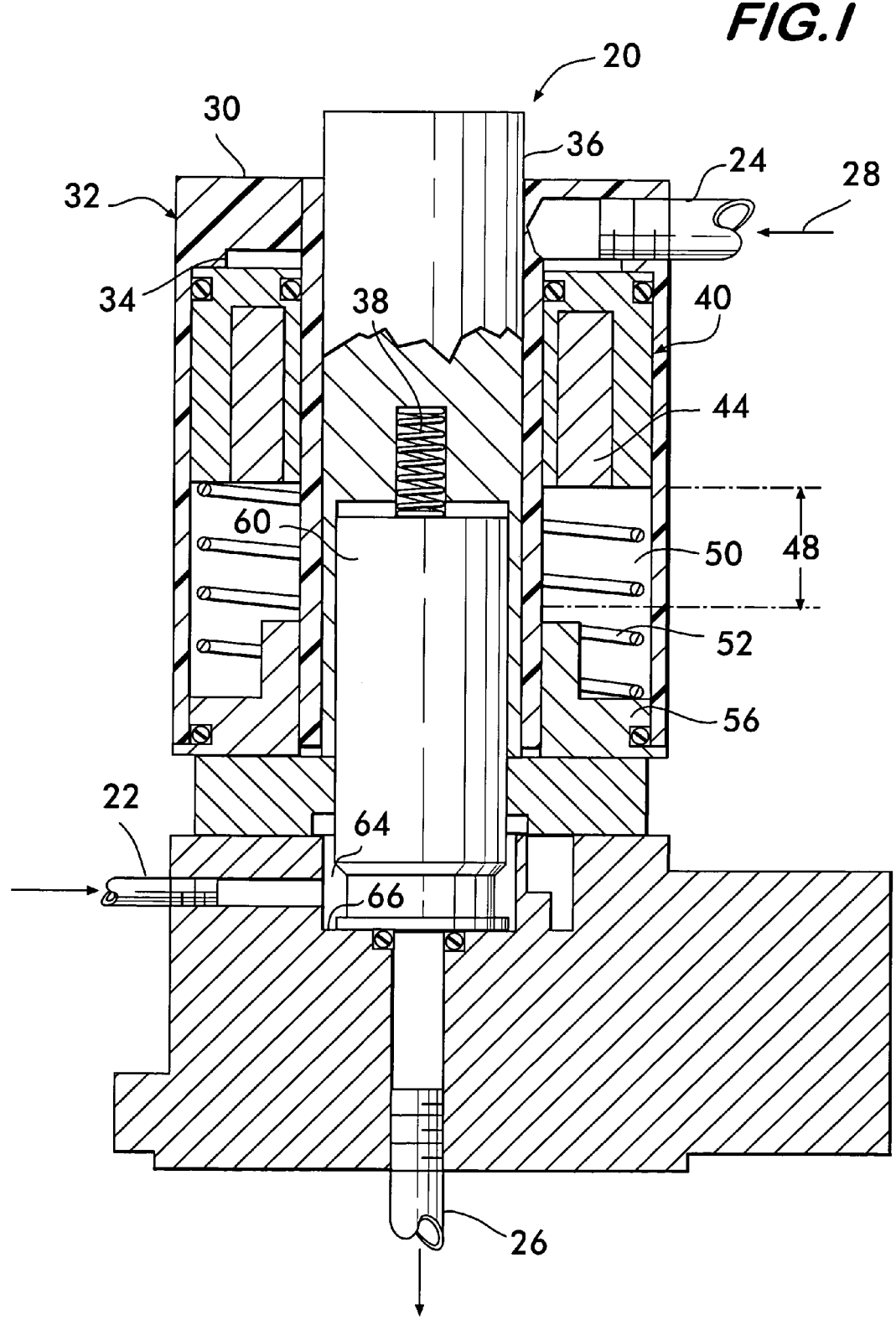
FIG. 1 shows a cross-sectional representation of the pneumatically actuated pilot valve of the present invention.

Referring now to FIG. 1, there is shown the pneumatically actuated pilot valve 20 of the present invention. In response to an air flow control signal 28 applied to the pneumatically actuated pilot valve 20, the pilot valve 20 provides a pilot signal outlet flow for use in controlling the opening and closing of a further fluid valve.

The pilot valve 20 includes a piston 60 disposed within a piston cylinder 36. When the piston 60 is in its extreme downward position it presses against a valve seat 66 formed by an annular portion of the bottom of a valve seat chamber 64. The pressure of the piston 60 against the valve seat 66 causes a fluid flow circuit between the pilot valve ports 22, 26 to be interrupted. The piston 60 is sealingly biased in the closed position against the valve seat 66 by a piston spring 38. The pneumatically actuated pilot valve 20 is thus a normally closed valve.

In order to open the pilot valve 20 and permit a fluid flow between the pilot valve ports 22, 26, the piston 60 must be moved upwardly against the closing force of the piston spring 38. In order to move the piston 60 in this manner, an upward force is applied to the piston 60 by applying the magnetic flux of a permanent magnet 44 to the piston 60. The permanent magnet 44 is disposed within a magnet assembly 40. The magnet assembly 40 is an annular assembly disposed within the magnet assembly cavity 50 surrounding the piston cylinder 36. An actuator spring 52 is disposed within the magnet assembly cavity 50 pressing against the magnet assembly 40 at its upper end and against an actuator spring seat 56 at its lower end in order to bias the magnet assembly 40 upward.

The permanent magnet 44 is moved toward the piston 60 by applying the positive air flow control signal 28 to the control inlet port 24. When a positive air flow control signal 28 is driven into the control inlet port 24, the magnet driving chamber 34 is expanded by the fluid pressure of the air flow control signal 28. The expansion of the magnet driving chamber 34 forces the magnet assembly 40 downward and brings the permanent magnet 44 closer to the piston 60 against the force of an actuator spring 52. The magnetic flux of the permanent magnetic 44 is thus applied to the piston 60 in response to the fluid signal applied to the control inlet port 24. Continued travel of the permanent magnet 44 through the magnet cavity 50 causes the magnetic flux applied to the piston 60 to increase.

In response to the pressure of the positive air flow control signal 28 applied to the control inlet port 24, the permanent magnet 44 travels a distance 48 through the magnet assembly cavity 50. The increasing upward force applied to the piston 60 by the permanent magnet 44 as it travels the distance 48 eventually causes the piston 60 to be actuated. When the piston 60 is actuated, it separates from the valve seat 66 thereby permitting fluid to flow between the ports 22, 26 by way of the valve seat chamber 64. Thus valve 20 can be used as a stand above valve as well as a pilot valve.

When the positive fluid flow applied to the annular magnet driving chamber 34 is withdrawn, the downward force upon the magnet assembly 40 is decreased. This permits the actuator spring 52 to expand within the magnet assembly cavity 50, thereby forcing the permanent magnet 44 in the upward direction. As the permanent magnet 44 travels upward the magnetic flux applied to the piston 60 is decreased. When the force applied to the piston 60 by the magnetic flux of the permanent magnet 44 decreases enough the downward force applied to the piston 60 by the piston spring 38 overcomes the upward force due to the magnetic flux, and the piston spring 38 sealingly forces the piston 60 against the valve seat 66. When the piston 60 is sealingly pressed against the valve seat 66 the fluid circuit between the ports 22, 26 of the pneumatically actuated fluid control valve 20 is interrupted and the pilot valve 20 is closed.

It will be understood that elements of the pneumatically actuated pilot valve 20 can cooperate to form a pneumatically actuated valve assembly 32. The pneumatically actuated valve assembly 32 includes an annular valve assembly housing 30 which houses the magnet assembly 40, the magnet driving chamber 34 and the actuator spring 52. The control inlet port 24 is coupled to the valve assembly housing 30. The entire valve assembly 32 fits over the piston cylinder 36 and is detachably secured to the pilot valve 20 in order for the pilot valve 20 to operate as described above.

Furthermore, when the valve assembly 32 is detached from the pilot valve 20 it can be removed from the piston cylinder 36, inverted, and fit back over the piston cylinder 36 in its inverted position. The valve assembly 32 can then be detachably secured in its inverted position to provide a pneumatically actuated pilot valve that operates as described in detail below. Significantly, the detachable valve assembly 32 of the pilot valve 20 can be interchanged between its inverted and non-inverted positions without breaking the fluid circuit between the valve ports 22, 26.

Thus, the pilot valve 20 can be interchanged in this manner between a normally closed valve and a normally open valve as required by the user. Additionally, a solenoid valve can be converted into a pneumatically actuated valve using the valve assembly 32. In order to make such a conversion the valve assembly 32 can be substituted for a solenoid actuator as found in many existing solenoid valves by merely removing a solenoid assembly originally provided with the solenoid valve and fitting the valve assembly 32 over the existing piston cylinder 36 of the solenoid valve. The method for attaching and detaching the valve assembly 32 is the conventional method used for solenoid valve assemblies, requiring the removal and replacement of a single nut (not shown).

Figure 2:
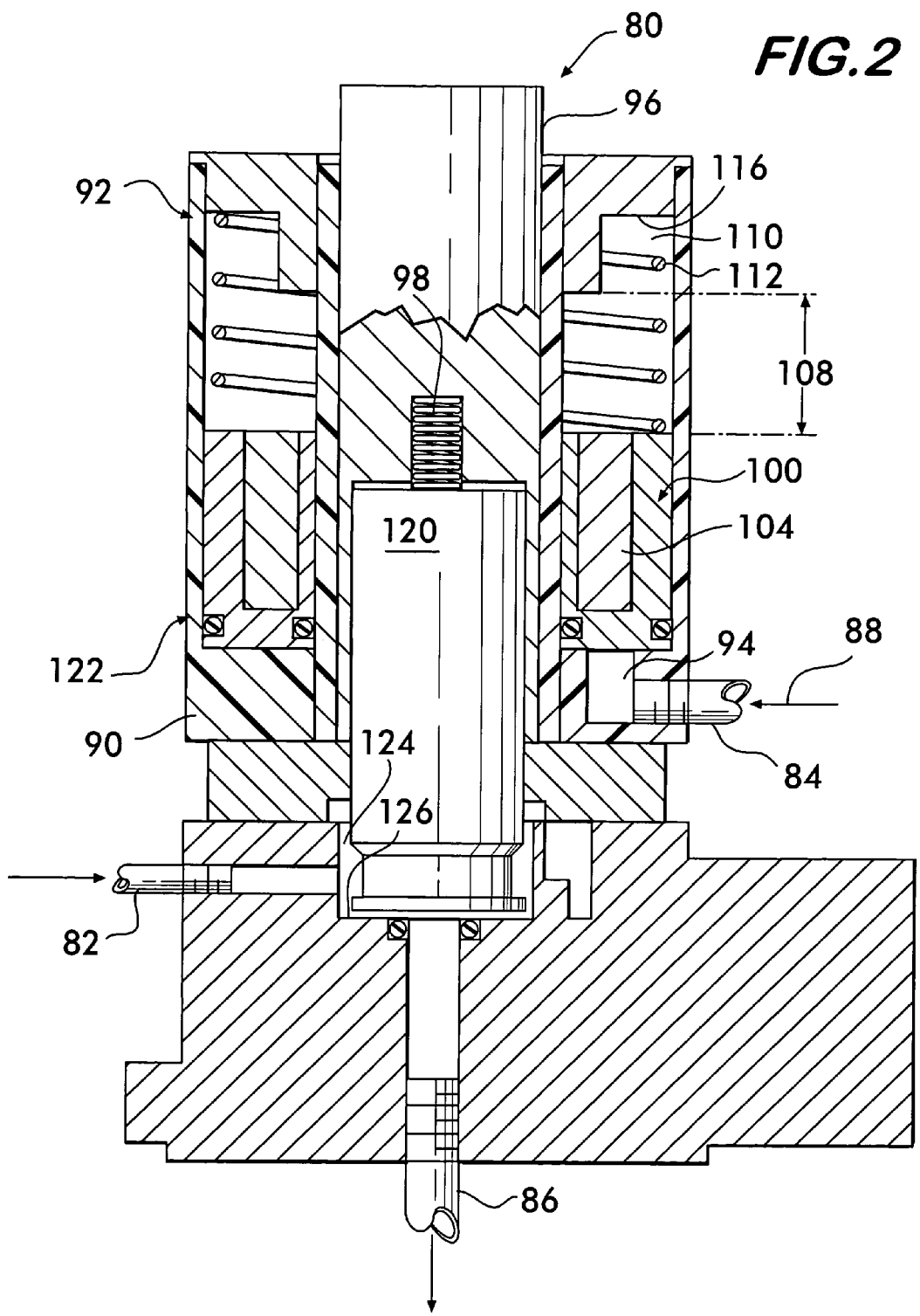
FIG. 2 shows an alternate embodiment of the pneumatically actuated pilot valve set forth in FIG. 1.

Referring now to FIG. 2, there is shown the pneumatically actuated pilot valve 80. The pneumatically actuated pilot valve 80 is an alternate embodiment of the pneumatically actuated pilot valve 20 wherein the pneumatically actuated valve assembly 32 of the pilot valve 20 is inverted to provide the inverted pneumatically actuated valve assembly 92 of the pilot valve 80.

The pilot valve 80 includes a piston 120 disposed within a piston cylinder 96. When the piston 120 is in its extreme downward position it presses against a valve seat 126 formed by an annular portion of the valve seat chamber 124. The pressure of the piston 120 against the valve seat 126 causes the fluid flow circuit between the pilot valve ports 82, 86 to be interrupted. The piston 120 is maintained in a spaced apart relationship with the valve seat 126 by an upward force due to the magnetic flux of the permanent magnet 104 acting against the downward force of the piston spring 98 when the actuation spring 112 forces the magnet assembly 100 toward the bottom of the magnet assembly cavity 110. The pneumatically actuated pilot valve 80 is thus a normally open valve.

The permanent magnet 104 is an annular magnet within the magnet assembly 100. The magnet assembly 100 is disposed within the magnet assembly cavity 110 surrounding the piston cylinder 96. The actuator spring 112 is disposed within the magnet assembly cavity 110 pressing against the magnet assembly 100 at its upper end and against an actuator spring seat 116 at its lower end in order to bias the magnet assembly 100 downwardly.

In order to close the pilot valve 80 and interrupt fluid flow between the pilot valve ports 82, 86, the piston 120 must be forced downward by the force of the piston spring 98. In order to move the piston 120 in this manner, the upward force applied to the piston 120 by the magnetic flux of a permanent magnet 104 must be decreased by moving the permanent magnet 104 in the upward direction.

The permanent magnet 104 is moved upward away from the piston 120 by applying a positive air flow control signal 88 to the control inlet port 84. When the positive air flow control signal 88 is driven into the control inlet port 84, the magnet driving chamber 94 is expanded by the fluid pressure of the air flow control signal 88. The expansion of the magnet driving chamber 94 caused by the air flow control signal 88 forces the magnet assembly 100 upward against the actuator spring 112 and moves the permanent magnet 104 away from the piston 120. Upward travel of the permanent magnet 104 through the magnet cavity 110 causes the magnetic flux applied to the piston 120 by the permanent magnet 104 to decrease.

In response to the pressure of the positive air flow control signal 88 applied to the control inlet port 84, the permanent magnet 104 travels a distance 108 through the magnet assembly cavity 110. The decreasing force applied to the piston 120 by the permanent magnet 104 as it travels the distance 108 eventually allows the downward force applied by the piston spring 98 to overcome the upward force due to the magnetic flux of the permanent magnet 104. This causes the piston 120 to be actuated. When the piston 120 is actuated, it is sealingly pressed against the valve seat 126 by the piston spring 98 thereby preventing fluid from flowing between the valve ports 82, 86.

When the positive fluid flow applied to the annular magnet driving chamber 94 is withdrawn, the upward force applied to the magnet assembly 100 is decreased. This permits the actuator spring 112 to expand within the magnet assembly cavity 110, thereby forcing the permanent magnet 104 in the downward direction. As the permanent magnet 104 travels downward the magnetic flux applied to the piston 120 increases. When the force applied to the piston 120 by the magnetic flux increases enough the force of the piston spring 98 is overcome and the piston 120 separates from the valve seat 126. When the piston 120 is separated from the valve seat 126 the fluid flow between the ports 82, 86 of the pneumatically actuated fluid control valve 80 can resume.

Figure 3:
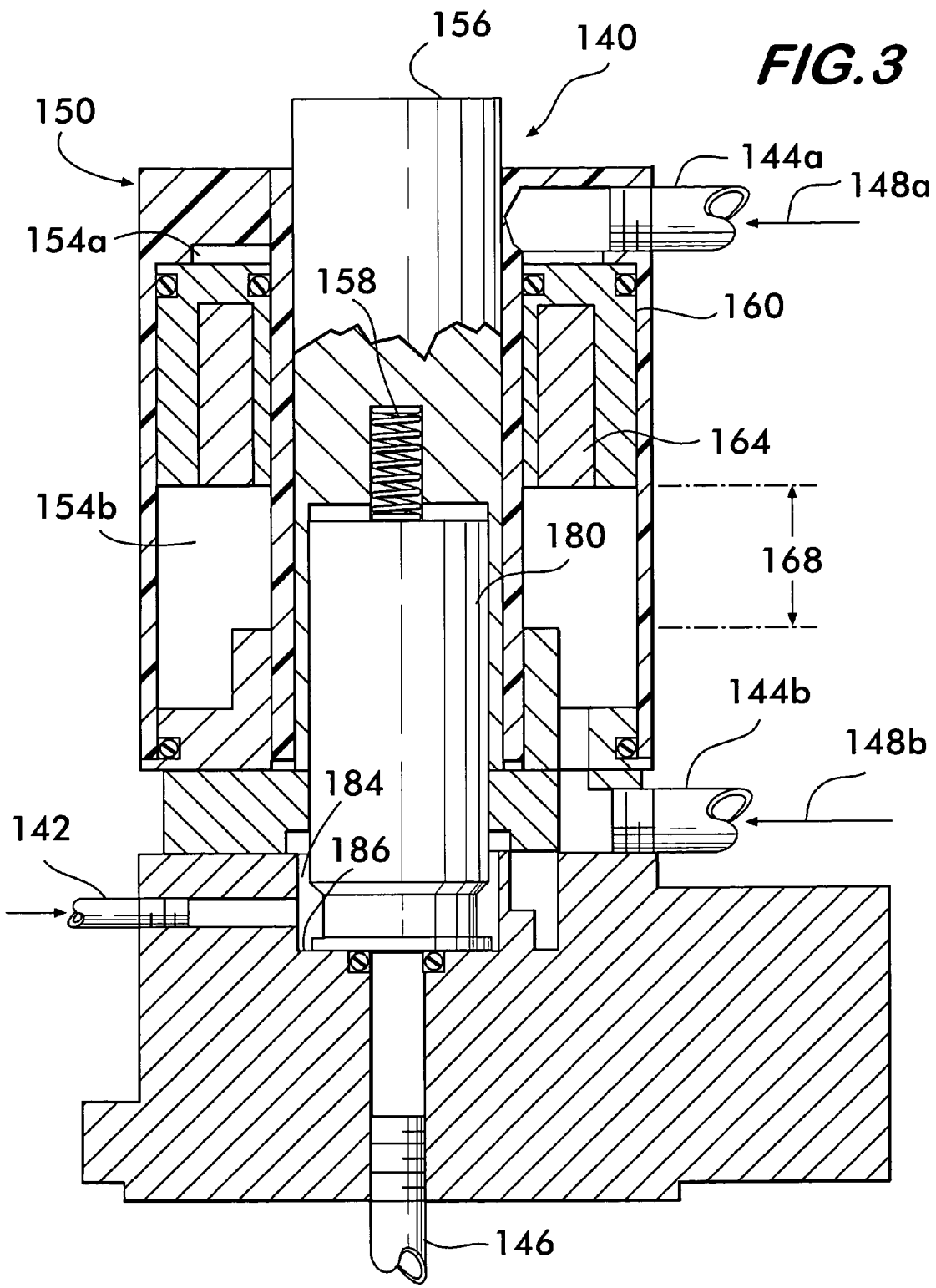
FIG. 3 shows an alternate embodiment of the pneumatically actuated pilot valve set forth in FIG. 1.

Referring now to FIG. 3, there is shown the pneumatically actuated pilot valve 140. The pneumatically actuated pilot valve 140 is an alternate embodiment of the pneumatically actuated pilot valve 20. The pilot valve 140 is provided with two control input ports 144a,b which receive respective air flow control signals 148a,b. The control input ports 144a,b communicate with respective magnet driving chambers 154a,b disposed on opposing sides of the magnet assembly 160 within the housing of the valve assembly 150. The relative pressures of the air flow control signals 148a,b thus determine the vertical position of the magnet assembly 160 within the valve assembly housing. As the relative pressures of the air flow control signals 148a,b vary the magnet assembly 160 can travel a distance 168.

When the pressure of the air flow control signal 148b exceeds the pressure of the air flow control signal 148a the magnet assembly 160 is moved to its upward position. Under these conditions magnetic flux from the permanent magnet 164 is not operatively applied to the piston 180. Therefore, the piston spring 158 forces the piston 180 sealingly against the valve seat 186, thereby preventing fluid flow between the valve ports 142, 146 by way of the valve chamber 184.

When the pressure of the air flow control signal 148a is increased to exceed the pressure of 148b the magnet assembly 160 travels downward and the magnetic flux applied to the piston 180 by the permanent magnet 164 increases, thereby applying an increasing upward force to the piston 180. Eventually, the upward force applied to the piston 180 overcomes the downward force of the piston spring 158 and opens the pilot valve 140. If the pressures of the air flow control signals 148a,b are maintained equal to each other at this point the pilot valve 140 can remain open. When the magnet assembly 160 travels farther in the downward direction, the permanent magnet 164 closes the pilot valve 140 as previously described with respect to the pilot valve 20.

Figure 4:
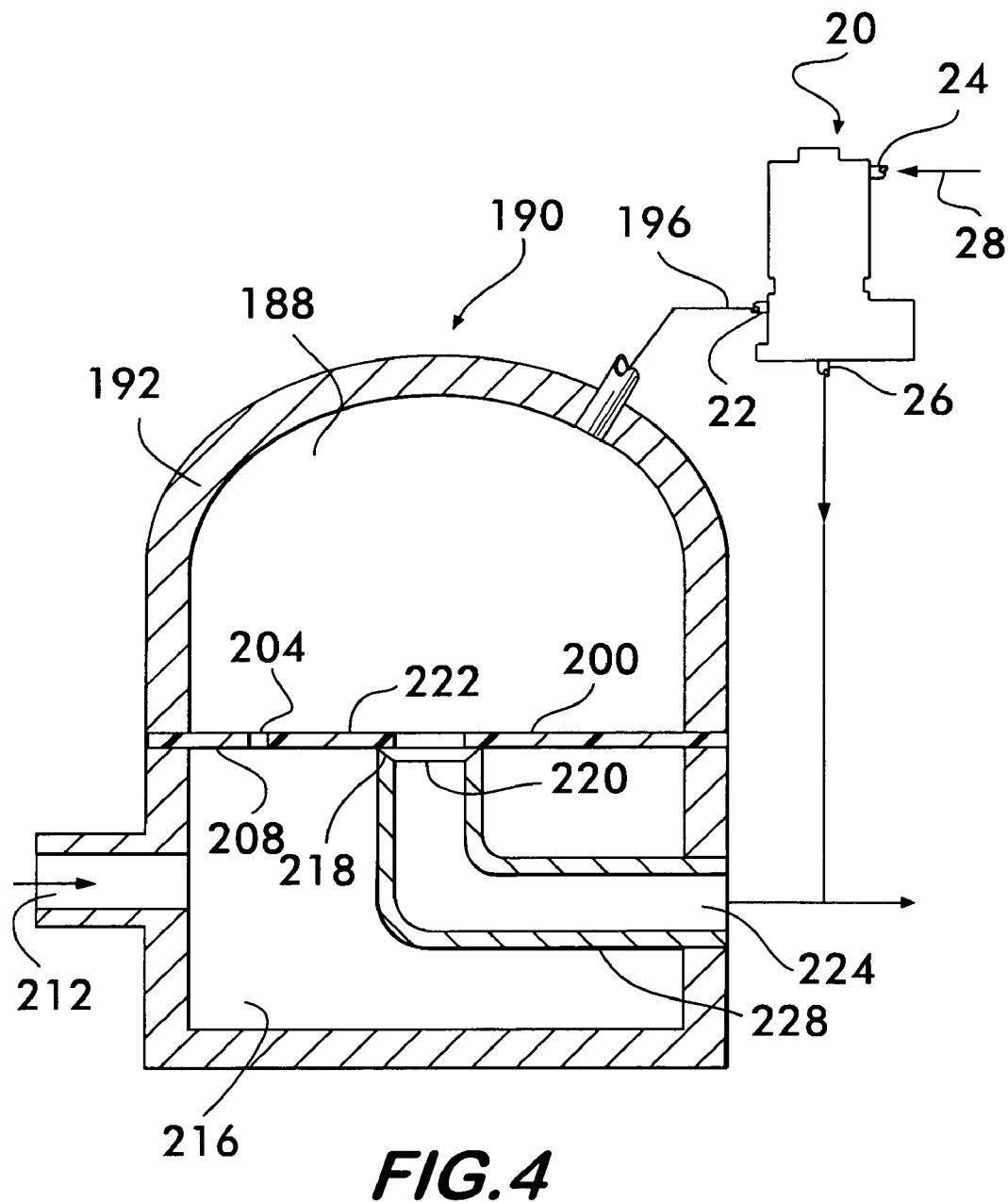
FIG. 4 shows a differential pressure diaphragm valve operated in accordance with a pilot signal provided by the pneumatically actuated pilot valve of FIG. 1.

Referring now to FIG. 4, there is shown the differential pressure diaphragm valve 190 operating under the control of the pneumatically actuated pilot valve 20. The differential pressure diaphragm valve 190 includes a valve housing 192. The interior of the valve housing 192 is divided into an upper valve chamber 188 and a lower valve chamber 216. The upper valve chamber 188 is separated from the lower valve chamber 216 by a diaphragm 200.

The lower valve chamber 216 is provided with a valve inlet port 212 and a valve outlet port 224 for permitting fluid flow therebetween. A valve outlet pipe 228 within the lower valve chamber 216 can communicate with the interior of the lower valve chamber 216 at one end and with the valve outlet port 224 at its other end. The interior end 218 of the valve outlet pipe 228 sealingly presses against an annular area of the lower diaphragm side 208 at the diaphragm region 220. The lower diaphragm side 208 presses against the inner end 218 of the valve outlet pipe 228 to thereby prevent the entry of fluid from the lower valve chamber 216 into the valve outlet pipe 228 and the outlet port 224, thereby sealing the differential pressure diaphragm valve 190.

The diaphragm 200 is provided with at least a leak hole 204 therethrough. The leak hole 204 through the diaphragm 200 causes the pressure in the upper valve chamber 188 to equalize with the pressure in the lower valve chamber 216 when the diaphragm valve 190 is closed. The pressure within the upper valve chamber 188 causes downward force to be applied to the upper diaphragm side 216. The magnitude of the downward force thus applied is related to the pressure within the upper valve chamber 128 and the surface area of the upper diaphragm side 222 upon which the pressure is applied. The downward pressure upon the diaphragm 200 generated in this manner forces the diaphragm 200 toward the inner end 218 of the valve outlet pipe 228.

The pressure of the fluid within the lower valve chamber 216 applies an upward force to the lower diaphragm side 208. The upward force applied to the lower diaphragm side 208 in this manner is related to the pressure of the fluid within the lower valve chamber 216 and the surface area over which the pressure is applied. However, the pressure applied to the lower diaphragm side 208 does not operate upon as much surface area as the pressure applied to the upper diaphragm side 222, because the inner end 218 of the valve outlet pipe 228 prevents pressure from being applied to the diaphragm 200 within the diaphragm region 220. Thus, the pressure equalized between the valve chambers 188, 216 by the leak hole 204 results in more downward force being applied to the diaphragm 200 than upward force. This differential downward force on the diaphragm 200 is the force which sealingly presses the diaphragm 200 against the inner end 218 of the valve outlet pipe 228 and closes the differential pressure diaphragm valve 190.

When the diaphragm 200 is no longer pressing against the inner end 218 fluid within the lower valve chamber 216 can enter the valve outlet pipe 228. The fluid in the outlet pipe 228 flows through the valve outlet pipe 228 and exits the diaphragm valve 190 by way of the outlet port 224, provided that the upstream pressure of the diaphragm valve 190 is greater than the downstream pressure. Thus, the pneumatically actuated pilot valve 20 can control the differential pressure diaphragm valve 190 without the use of electricity and the pilot valve 20 is therefore intrinsically safe for controlling valves when disposed in hazardous environments.

When the air flow control signal 28 is applied to the control inlet port 24 of the pneumatically actuated pilot valve 20, fluid is removed from the upper valve chamber 188 by way of the fluid line 196 and received into the valve inlet port 22 of the pneumatically actuated pilot valve 20. As fluid is removed from the upper valve chamber 188, fluid leaks into the upper valve chamber 188 from the lower valve chamber 216 by way of the leak hole 204 in the diaphragm 200.

If the number and size of the leak holes 204 are selected such that fluid leaks through the leak holes 204 into the upper valve chamber 188 at a rate that is slower than the rate at which the fluid is removed from the upper valve chamber 188 through the feed line 196, the pressure within the upper valve chamber 188 drops. As the pressure within the upper valve chamber 188 drops the amount of downward force applied to the upper diaphragm side 222 drops. Eventually, the downward force applied to the upper diaphragm side 222 becomes less than the upward force applied to the lower diaphragm side 208. When this happens the diaphragm 200 is deflected upward and the diaphragm region 220 moves away from its sealing contact with the inner end 218 of the valve outlet pipe 228.

When the diaphragm 200 is no longer pressing against the inner end 218 fluid within the lower valve chamber 216 can enter the valve outlet pipe 228. The fluid in the outlet pipe 228 flows through the valve outlet pipe 228 and exits the diaphragm valve 180 by way of the outlet port 224, provided that the upstream pressure of the diaphragm valve 180 is greater than the downstream pressure. Thus, the pneumatically actuated pilot valve 20 can control the differential pressure diaphragm valve 180 without the use of electricity and the pilot valve 20 is therefore intrinsically safe for controlling valves when disposed in hazardous environments.

While the invention has been described in detail and with reference to specific examples thereof, it will be apparent to one skilled in the art that various changes and modifications can be made therein without departing from the spirit and scope thereof.

What is claimed is:

1. A pneumatically actuated fluid control valve for permitting fluid flow from a valve inlet to a valve outlet, comprising:
   a. a piston having a valve open position and a valve closed position for controlling said fluid flow, said piston having at least a piston portion that is magnetically conductive, said magnetically conductive piston portion being movable away from the vicinity of a valve seat to said valve open position and sealingly moveable into the vicinity of said valve seat to said valve closed position, whereby said magnetically conductive piston portion and said valve seat act cooperatively to close said valve when said valve is in said valve closed position;
   b. a piston actuator including a permanent magnet having magnetic flux for applying said magnetic flux to said magnetically conductive piston portion;
   c. at least first and second piston actuator positions for magnetically disposing said magnetically conductive piston portion in a selected one of said valve open and valve closed positions; and
   d. a pneumatic actuator driving circuit for pneumatically moving said piston actuator from one to the other of said first and second piston actuator positions in accordance with said magnetic flux applied to said magnetically conductive piston portion and independently of any mechanical coupling operative to transmit mechanical energy from said permanent magnet to said magnetically conductive piston portion whereby said pneumatic actuator driving circuit pneumatically moves said piston from one to the other of said valve open and said valve closed positions.

2. The pneumatically actuated fluid control valve of claim 1, wherein said pneumatic actuator driving circuit comprises a magnet driving chamber having a chamber volume for receiving an air flow control signal.

3. The pneumatically actuated fluid control valve of claim 2, wherein said chamber volume is adjusted by said air flow control signal.

4. The pneumatically actuated fluid control valve of claim 3, wherein said piston actuator is moved from one to the other of said first and second piston actuator positions when said chamber volume is adjusted.

5. The pneumatically actuated fluid control valve of claim 4, wherein said permanent magnet is disposed within a magnet assembly and said magnet assembly is moved from one to the other of said first and second piston actuator positions.

6. The pneumatically actuated fluid control valve of claim 4, wherein said piston is disposed within a piston cavity and said permanent magnet comprises an annular permanent magnet surrounding said piston cavity.

7. The pneumatically actuated fluid control valve of claim 6, wherein said pneumatic actuator driving circuit comprises an annular pneumatic circuit surrounding said piston cavity.

8. The pneumatically actuated fluid control valve of claim 7, further comprising an actuator spring applied to said piston actuator in opposition to said moving of said piston actuator when said chamber volume is increased.

9. The pneumatically actuated fluid control valve of claim 8, wherein said actuator spring surrounds said piston cavity.

10. The pneumatically actuated fluid control valve of claim 4, including a valve seat for sealingly pressing said piston against said valve seat to close said pneumatically actuated fluid control valve when said piston actuator is in one of said first and second piston actuator positions.

11. The pneumatically actuated fluid control valve of claim 10, comprising a valve seat chamber in fluid communication with said valve inlet and said valve outlet wherein motion of said piston through said valve seat chamber to said valve seat prevents fluid flow between said valve inlet and said valve outlet.

12. The pneumatically actuated fluid control valve of claim 2, further comprising a valve assembly, said valve assembly including said permanent magnet and said magnet driving chamber.

13. The pneumatically actuated fluid control valve of claim 12, wherein said valve assembly is detachably secured to said pneumatically controlled fluid control valve.

14. The pneumatically actuated fluid control valve of claim 13, wherein said valve assembly is adapted to be detachably secured in first and second valve assembly positions.

15. The pneumatically actuated fluid control valve of claim 14, wherein said valve assembly comprises an annular assembly.

16. The pneumatically actuated fluid control valve of claim 14, wherein said annular valve assembly surrounds said piston.

17. The pneumatically actuated fluid control valve of claim 14, wherein said first valve assembly position comprises a normally closed valve assembly position and a positive airflow control signal into said magnet driving assembly adjusts said chamber volume to apply increasing magnet flux to said piston and to move said piston from said valve closed position to said valve open position.

18. The pneumatically actuated fluid control valve of claim 17, wherein the force of said increasing magnet flux opposes and overcomes a compressive force applied to said piston in order to move said piston to said valve open position.

19. The pneumatically actuated fluid control valve of claim 14, wherein said second valve assembly position comprises a normally open valve assembly position and a positive air flow control signal into said magnet driving chamber adjusts said chamber volume to apply decreasing magnetic flux to said piston and to move said piston from said valve open position to said valve closed position.

20. The pneumatically actuated fluid control valve of claim 19, wherein increasing chamber volume moves said actuator away from said piston to permit said piston to be compressibly moved toward a valve seat.

21. The pneumatically actuated fluid control valve of claim 14, wherein said first and second valve assembly positions comprise an inverted assembly position and an non-inverted assembly position.

22. The pneumatically actuated fluid control valve of claim 2, comprising a further magnet driving chamber and a further air flow control signal for applying opposing pressures to said piston in accordance with said air flow control signals to provide a differential pressure to said piston actuator.

23. The pneumatically actuated fluid control valve of claim 22, wherein the magnetic flux applied to said piston by said permanent magnet is adjusted in accordance with said differential pressure.

24. The pneumatically actuated fluid control valve of claim 23, wherein said piston is moved from one to the other of said valve open position and said valve closed position in accordance with said differential pressure.

* * * * *